No. 635,518. Patented Oct. 24, 1899.
G. SITTMANN.
VARIABLE SPEED GEARING.
(Application filed July 1, 1898.)
(No Model.) 5 Sheets—Sheet 2.

WITNESSES
INVENTOR
BY
ATTORNEY

No. 635,518. Patented Oct. 24, 1899.
G. SITTMANN.
VARIABLE SPEED GEARING.
(Application filed July 1, 1898.)
(No Model.) 5 Sheets—Sheet 4.
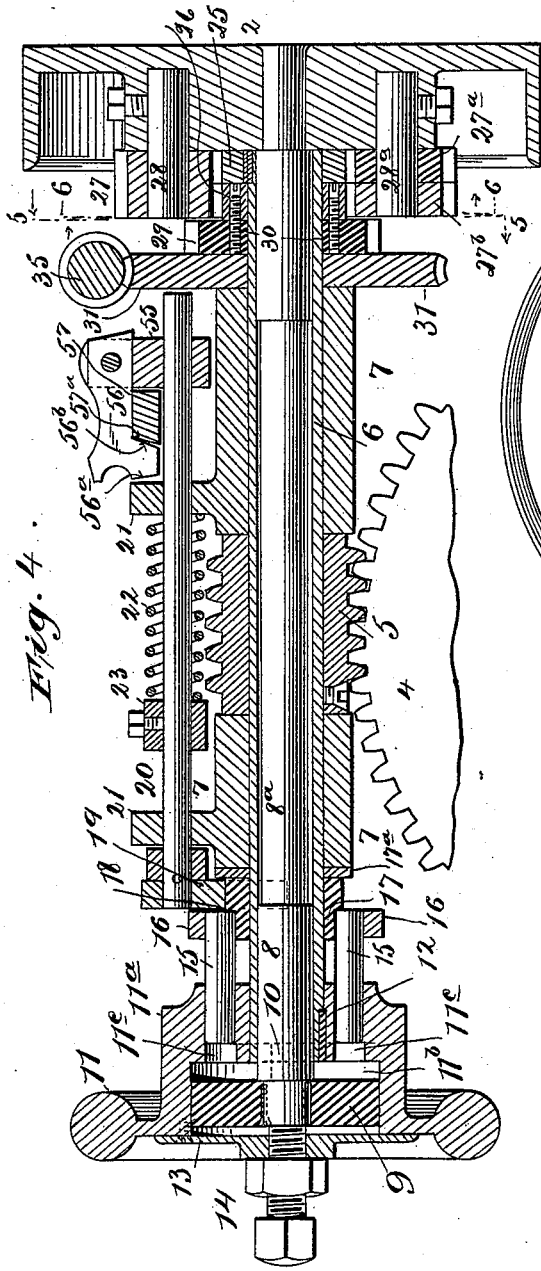
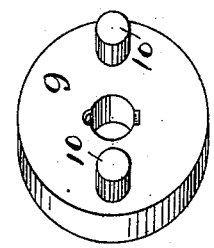
WITNESSES
INVENTOR
BY
ATTORNEY
THE NORRIS PETERS CO., PHOTO-LITHO., WASHINGTON, D. C.

No. 635,518. Patented Oct. 24, 1899.
G. SITTMANN.
VARIABLE SPEED GEARING.
(Application filed July 1, 1898.)
(No Model.) 5 Sheets—Sheet 3.

WITNESSES
C. W. Benjamin
F. E. Turner

INVENTOR
G. Sittmann,
BY
T. F. Bourne,
his ATTORNEY

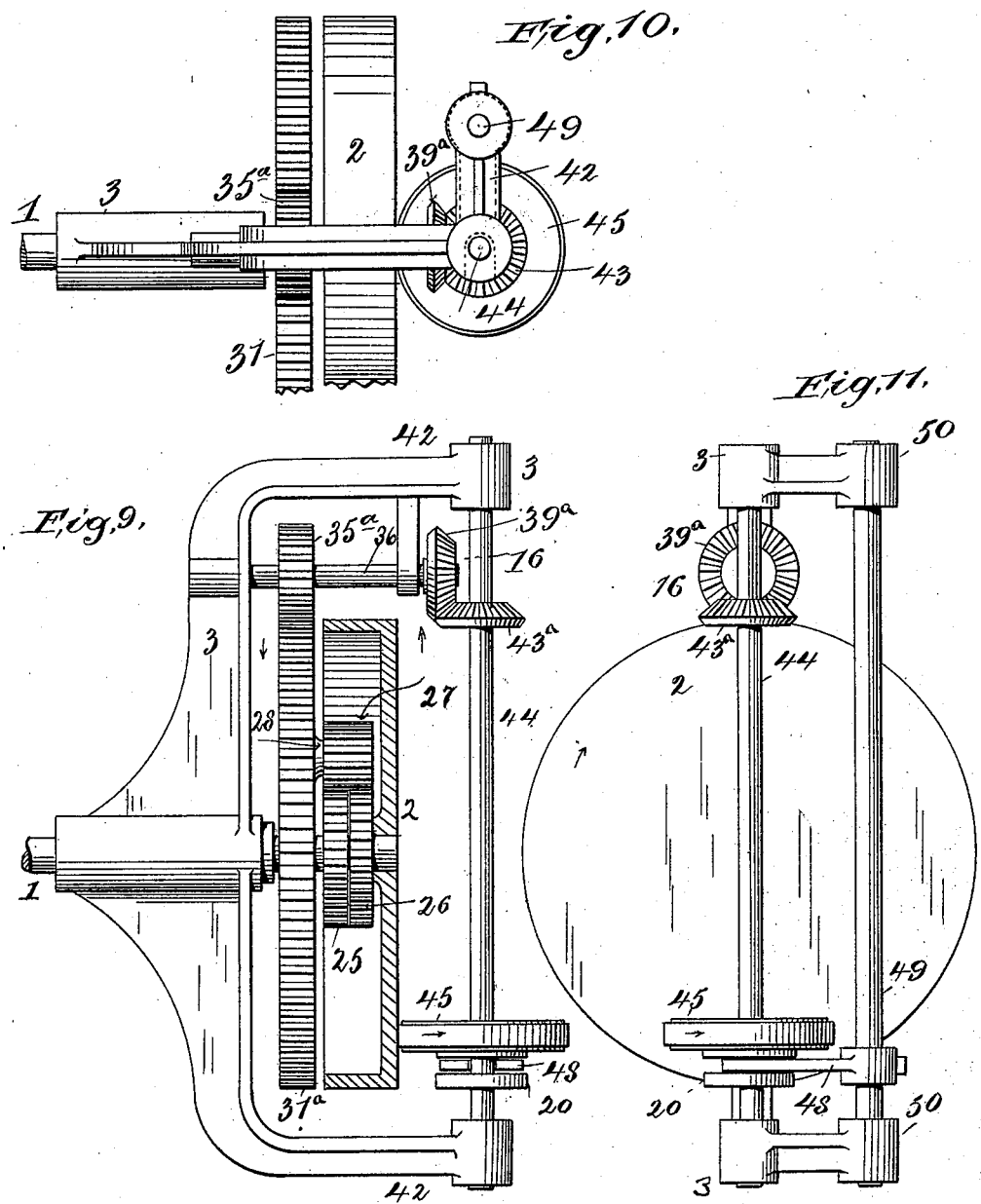

UNITED STATES PATENT OFFICE.

GUSTAV SITTMANN, OF NEW YORK, N. Y.

VARIABLE-SPEED GEARING.

SPECIFICATION forming part of Letters Patent No. 635,518, dated October 24, 1899.

Application filed July 1, 1898. Serial No. 684,985. (No model.)

*To all whom it may concern:*

Be it known that I, GUSTAV SITTMANN, a citizen of the United States, residing in New York city, borough of Brooklyn, county of Kings, State of New York, have invented certain new and useful Improvements in Variable-Speed Gearings, of which the following is a specification.

My invention relates to improved means whereby a driven part or shaft may be rotated at different or varying speeds; and one of the objects of the invention is to enable such driven part or shaft to be rotated at a maximum speed and then to reduce such speed to any desired degree, which may be accomplished without stopping the device.

The invention consists in a mechanism comprising a driven part, a driving part to act upon the driven part, gears, a pinion adapted to engage said gears and to be carried around the same, and means for causing said pinion to operate upon said gears at different speeds, according to adjustment, whereby the speed of the driven part may be varied in accordance with said adjustment.

The invention also consists in a mechanism comprising a driven part or shaft, a driving part, means for connecting the driving part with the driven part, so that they can rotate at a definite or the same speed, and means for regulating the driven part by the driving part, so that the former will be driven by the latter at a speed commensurate with the adjustment of the devices that control said parts.

The invention also consists in a mechanism comprising a driven part, a driving part, a shaft and a sleeve adapted to operate the driven part, means for positively connecting and for disconnecting said shaft and sleeve, and means adapted to control the operation of said sleeve by the driving part for varying the speed of said sleeve when it is disconnected from the shaft.

The invention consists in the novel details of improvement and the combination of parts that will be more fully hereinafter set forth and then pointed out in the claims.

Reference is to be had to the accompanying drawings, forming part hereof, wherein—

Figure 1:
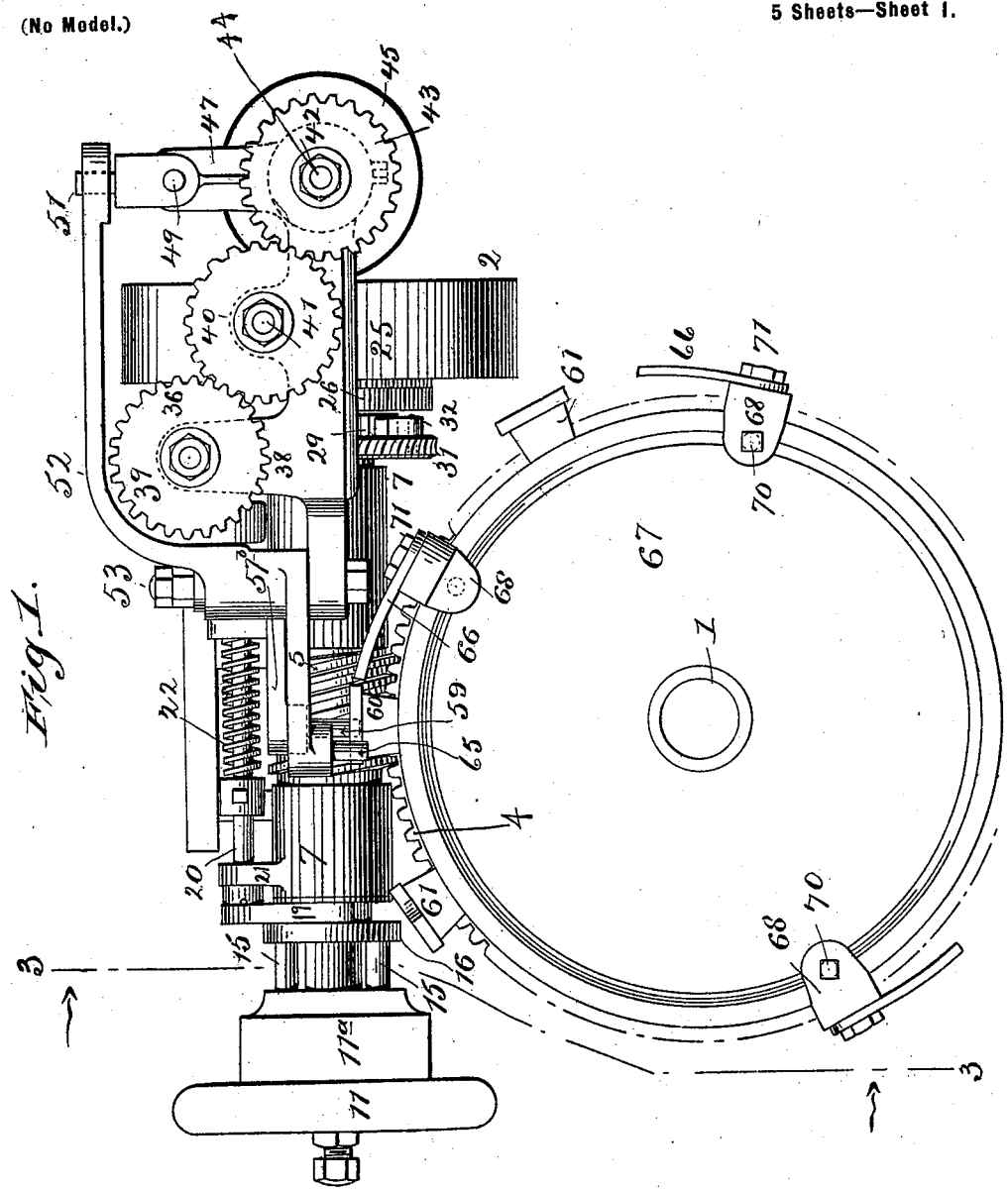
Figure 2:
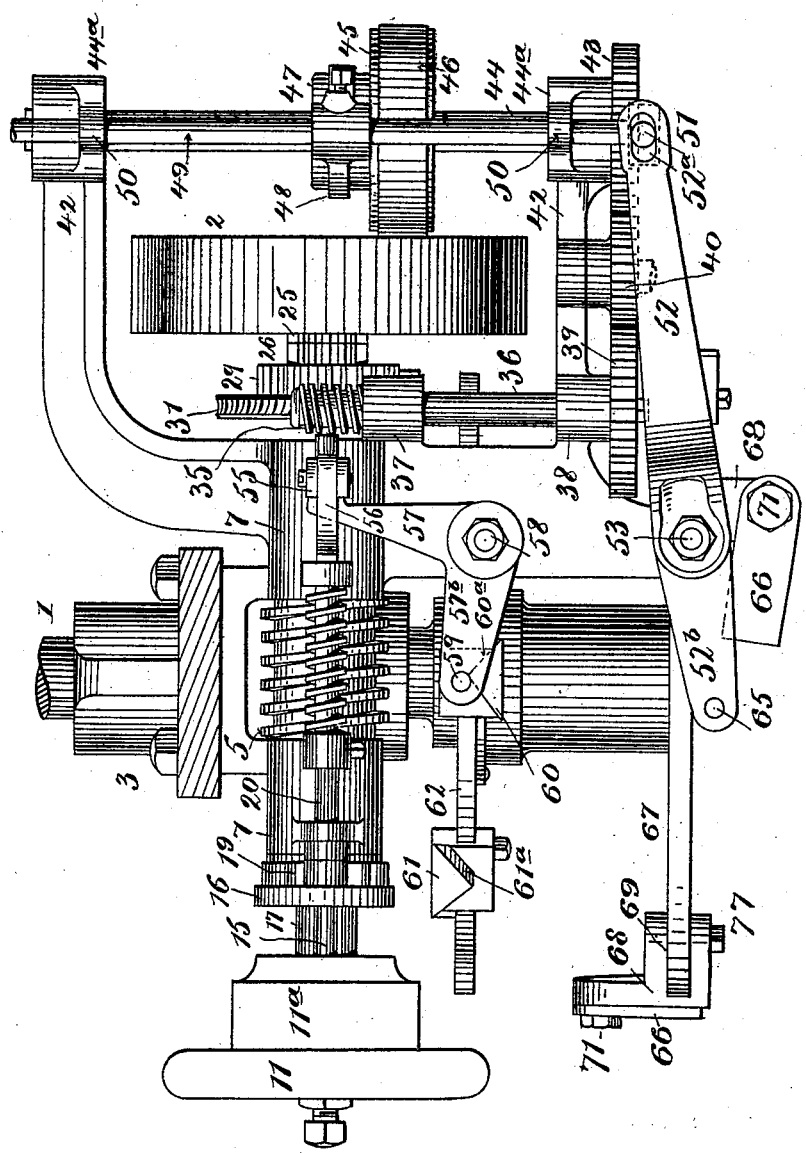
Figure 3:
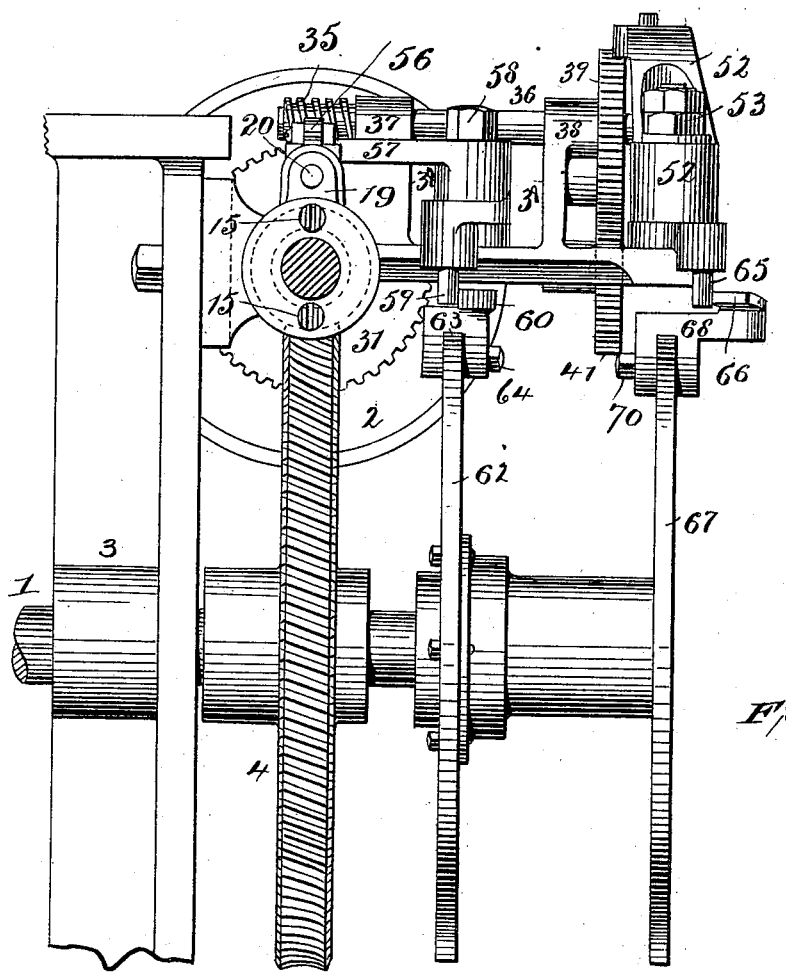

Figure 1 is a front elevation of a mechanism embodying my invention. Fig. 2 is a plan view thereof. Fig. 3 is an end elevation looking from the left in Fig. 2, part being broken away on the line 3 3 in Fig. 1. Fig. 4 is a vertical section through the main operative part of the device, corresponding in position to Fig. 1. Fig. 5 is a cross-section on the line 5 5 in Fig. 4, looking toward the left. Fig. 6 is a face view of the driving part or band-wheel, taken on the line 6 6 in Fig. 4, looking toward the right. Fig. 7 is a detail perspective view of part of the clutch shown in Fig. 4. Fig. 8 is a detail edge view of pinions shown in Figs. 4 and 6. Fig. 9 is a side elevation of a modification. Fig. 10 is a plan view thereof, and Fig. 11 is a front elevation looking from the right in Fig. 9.

In the accompanying drawings, in which similar numerals of reference indicate corresponding parts in the several views, 1 indicates a part to be driven, which may be a shaft or the like, and 2 is a driving part adapted to operate part 1, and it is shown in the form of a pulley or band-wheel.

3 is a support or frame for the various parts of the device, in which the driven part or shaft 1 may be suitably journaled.

Between the driven part or shaft 1 and the driving part or pulley 2 are devices adapted to cause the part 1 to be driven by the part 2 at the same speed or at different speeds, and for this purpose in Figs. 1 to 8, inclusive, I have shown the following arrangement: Upon the driven part or shaft 1 is secured a wheel 4, shown in the form of a worm-wheel, that meshes with a worm 5, secured upon a sleeve or hollow shaft 6, that is journaled in suitable bearings 7, carried by the frame or support 3. Within the sleeve or hollow shaft 6 is journaled a shaft 8, whose central portion is shown reduced in diameter at $8^a$ to lessen friction, and which shaft projects from opposite ends of sleeve 6. The driving part or pulley 2 is secured to one end of shaft 8, and a clutch is provided to rigidly unite the sleeve 6 to said shaft. The clutch I have shown is arranged as follows:

9 is a disk secured upon shaft 8 and provided with one or more studs or pins 10, that project inwardly parallel to shaft 8. (See Fig. 7 and dotted line in Fig. 4.) The disk 9 may be secured to shaft 8 by a spline, feather, a screw, or in any other desired manner. (See Fig. 4.)

11 is a hand-wheel, shown provided with a recessed hub 11ª, secured upon sleeve 6, as by a screw or key 12, the disk 9 being located within the recess 11ᵇ of said hub. (See Fig. 4.)
13 is a plate covering the recess 11ᵇ in hub 11ª and shown provided with an aperture to receive the threaded end of shaft 8, upon which nuts 14 fit to assist in holding said cover in position. The hub 11ª is provided with one or more bores 11ᶜ, that extend parallel to shaft 8, in which are located clutch bars or rods 15, that are adapted to move longitudinally within said bores and to engage and disengage studs 10 of disk 9. The clutch-bars 15 are secured to a flange 16, that projects from a sleeve 17, which is shown mounted to slide upon sleeve 6, and the sleeve 17 has a shoulder 18, against which the end of the clutch-bars 15 may abut, said bars being rigidly secured to the flange 16, and the sleeve 17 also has an annular shoulder 17ª. Thus it will be seen that when the clutch-bars 15 are thrown into the path of studs 10 the sleeve 6 and shaft 8 will be rigidly locked together through the medium of the parts 11ª, 15, 10, and 9 and that when said clutch-bars are moved out of line with said studs the sleeve 6 will be free to rotate independently of said shaft. The hand-wheel 11 may be used to rotate sleeve 6 for purposes of adjustment.

I have shown means for automatically shifting the clutch-bars 15, wherein 19 is a fork that embraces sleeve 17 and is located in a groove formed between flanges 16 and 17ª, and to said fork is secured a rod 20, that is journaled to slide in apertured lugs or bearings 21, shown carried by the bearings 7.

22 is a spring shown coiled around rod 20 and bearing against a lug 21 and against a stop 23 upon said rod, the tendency of which spring is to throw the clutch into action by moving rod 20 to the left in Fig. 4, under which conditions the sleeve 6 and shaft 8 will be driven at the same speed by the driving part or pulley 2, whereby the normal speed of pulley 2 will be transmitted to the driven part 1 through the medium of the worm-gear 4 5. Devices for causing rod 20 to shift will be described hereinafter.

It will be seen that the inner face of pulley 2 and the corresponding end of sleeve 6 are close together, and upon said sleeve is secured a gear-wheel 25, and 26 is a gear-wheel placed contiguous to gear 25 and journaled to rotate freely upon sleeve or shaft 6. The teeth upon these gears 25 26 are differential—such, for instance, as twenty-four teeth upon gear 25 and twenty-three teeth upon gear 26—this differential feature being illustrated in Fig. 5.

27 is a pinion carried by pulley 2 and adapted to mesh with the gears 25 26 and to be carried bodily around said gears. The pinion 27 is shown journaled upon a stud 28, secured to and projecting from the inner face of pulley 2. From this it will be understood that as pulley 2 rotates the pinion 27 in traveling around gears 25 26 will cause motion to be transmitted from one of said gears to sleeve 6, owing to the differential arrangement of their teeth. If now gear 26 is held from rotation, the traveling of pinion 27 around said gears will cause gear 25 to rotate at a speed commensurate with the differential of the gears 25 26, and this will be the highest speed that said pinion can transmit to sleeve 6. Now if gear 26 is caused to rotate independently, the speed of rotation transmitted to gear 25 will be reduced in accordance with the speed of rotation transmitted to pinion 27, notwithstanding the normal rotation of pulley 2. For the purpose of thus causing gear 26 to have independent rotation to vary the speed of rotation of sleeve 6 I have provided means for regulating said movement of gear 26 by the action of pulley 2, the arrangement shown for this purpose being as follows:

29 is a ratchet-wheel mounted loosely upon sleeve 6 and secured rigidly to gear 26, as by screws 30. (See Fig. 4.) 31 is a worm-wheel also loose on sleeve 6, and this worm-wheel carries a pawl 32, that is adapted to engage the teeth of ratchet 29. (See Figs. 1 and 5.) The pawl 32 is adapted to be held in engagement with ratchet 29 by means of a spring 32ª, carried by wheel 31 and resting against a pin 34, carried by said pawl and projecting into slot 33, (see Fig. 5;) but of course the spring may be otherwise suitably arranged, if desired. The worm-wheel 31 is in mesh with a worm 35, carried by a shaft 36, shown journaled in bearings 37 38, carried by the frame or support 3, and upon shaft 36 is secured a spur-wheel 39, that meshes with a spur-wheel 40, journaled upon a stud 41, carried by a bracket 42, projecting from support or frame 3, and the wheel 40 meshes with a spur-wheel 43, secured to a shaft 44, journaled in bearings 44ª, carried by bracket 42. (See Fig. 2.) Upon shaft 44 is mounted a wheel 45, that may be splined thereto to slide thereon and rotate said shaft. Said wheel is adapted to be driven by pulley 2 through frictional contact therewith, and by preference a leather or other suitable band 46 is secured upon wheel 45 to increase the frictional contact with pulley 2. (See Fig. 2.) The contact-point of pulley 2 and wheel 45 is preferably in the horizontal diameter of said pulley, and the wheel 45 is adapted to be shifted along the face of pulley or wheel 2 between the axis thereof and the periphery, whereby the wheel 45 may be at rest when in line with the axis of pulley 2 and will be rotated at a greater or less speed by said pulley, according to the distance that it is adjusted from the axis toward the periphery of said pulley. The means I have shown for shifting wheel 45 consists of a grooved hub 47, carried by said wheel, that receives a fork 48, that is secured to a rod 49, journaled to slide in bearings 50 on bracket 42, and from shaft 49 extends a finger 51, that enters a slot 52ª in a rocker-arm 52, journaled upon pivot 53, carried by the support or frame 3. The means for operating rocker-arm 52 will be described hereinafter. From the foregoing it will be understood that when wheel 45 rotates motion will be communicated to worm 35, which will rotate worm-wheel 31, and the pawl 32, by engaging ratchet-wheel 29, will rotate gear 26 forwardly or to the right in Fig. 5. Now as pinion 27 is being carried around the gear 25 26 at the same time that wheel 45 is acting to rotate gear 26 independently through the connections just described this movement of gear 26 will cause a corresponding loss of rotation to be communicated to gear 25 by pinion 27, because the advance of gear 26 causes the effect of the differential between gear 25 26, through the medium of pinion 27, to be altered, and thus the gear 26, the sleeve 6, and the driven part 1 will be rotated at a speed slower than would occur were gear 26 held stationary. It will be understood, therefore, that the greater the speed imparted to wheels 45, 31, and 26 the less will be the speed transmitted through gear 25 to sleeve 6 and the driven part 1, and the slower the speed of wheel 45 the greater will be the speed transmitted to the driven part 1, because the gear 26 will be rotated slower, and therefore the pinion 27 can rotate the gear 25 faster. The wheel 45 will be adjusted along the face of pulley 2 more or less, according to the speed desired to be given to the driven part or shaft 1.

It will be understood from what has been stated that when it is desired to drive shaft 1 at the highest speed by pulley 2 the clutch 10 15, &c., will be thrown into engagement, so as to connect pulley 2, shaft 8, and sleeve 6 rigidly together to drive shaft 1 through the worms 4 5, and that when shaft 1 is next to be driven at a reduced speed said clutch will be disconnected and wheel 45 will be adjusted along pulley 2 to the desired position to cause pinion 27 and gears 25 26 to rotate sleeve 6 and shaft 1 at the desired speed, the adjustment of the wheel 45 along pulley 2 serving to regulate such speed of the driven part.

While the devices will operate successfully with a single pinion 27, I have shown the pulley 2 as provided with a double set of pinions placed diametrically opposite each other, wherein 27$^a$ 27$^b$ are two pinions having similar teeth and secured together, so as to rotate in unison, these teeth being so arranged as to properly mesh with the differential teeth of gears 25 26 as they travel around said gears, whereby said pinions will be prevented from jamming in the teeth of said gears. The purpose of this arrangement is to balance the strain and wear upon shaft 8 and sleeve 6. These pinions 27$^a$ 27$^b$ are shown journaled upon a stud 28$^a$, carried by pulley 2.

The clutch 10 15, &c., and the wheel 45 may be operated by any suitable means. I have shown an arrangement whereby said parts may be shifted at predetermined times for the purpose of changing the speed of shaft 1, as may be required. To operate clutch 10 15, &c., I have shown the following arrangement: Upon rod 20 is secured a block 55, having two ears, between which is journaled a latch or dog 56, one end of which is adapted to engage a lug 21, and thereby to arrest the tendency of spring 22 to move rod 20, whereby the clutch 10 15, &c., is held in disengagement. Latch 56 is shown provided with a beveled face 56$^a$ to ride against lug 21 and with a reversely-beveled face 56$^b$, against which a correspondingly-beveled edge 57$^a$ of the finger 57 is adapted to bear, so that as said finger is moved to the left in Fig. 4 it will raise the latch 56 above lug 21, and thereby allow spring 22 to push rod 20 and clutch-bars 15. The finger 57 is also adapted to bear against block 55 to push rod 20 to the right in Fig. 4 against the influence of spring 22. The finger 57 is shown journaled upon a pivot 58, carried by support or frame 3. (See Figs. 2 and 3.) The finger 57 is shown in the form of a bell-crank whose arm 57$^b$ carries a pin 59, adapted to be engaged by cams 60 61, shown carried by a disk 62, rigidly connected with shaft 1. (See Fig. 2.) These cams are preferably in the form of blocks, having their inclined faces 60$^a$ 61$^a$ arranged in such position as to rock the finger 57 on its pivot, (see Fig. 2,) and these blocks are shown provided with recesses 63, adapted to receive the disk 62, and 64 are set-screws to hold the blocks upon said disk. By this means the cams 60 61 can be adjusted around the periphery of disk 62, so as to cause the finger 57 to operate at various times, and in accordance with the relative positions of these cams upon said disk the clutches 10 15, &c., will be thrown in and out of mesh. Thus when cam 60 operates upon pin 59 arm 57 will be thrown to the right in Fig. 2 and will thus draw rod 20 back to disengage the clutch, whereupon latch 56 will drop behind lug 21, and thus hold the clutch in that position, whereby the shaft 1 can be driven by pulley 2 through the medium of gears 25 26 and sleeve 6. This will be on what I may term the "slow" speed, and when it is desired to have shaft 1 driven at the fast speed the cam 61 will engage pin 59 and rock the finger 57, whereupon the latter will lift latch 56 above lug 51 and allow spring 22 to move rod 20 and clutch-bars 15 to cause them to engage studs 10, whereupon the pulley 2, shaft 8, and sleeve 6 will be locked rigidly together to drive shaft 1 directly by pulley 2. As disk 62 rotates with shaft 1 and as the cams 60 61 can be adjusted around disk 62, it is evident that the clutch can be controlled in any desired manner as to time of operation.

For some kinds of work it will be found convenient to rotate shaft 1 at one speed and then at another, and so on, according to the class of work to be operated upon, for which purpose the shaft 1 will be driven through the medium of gears 25 26, and to cause the speed of said shaft to be varied through said gears I have shown the following arrangement: The rocker-arm 52, which is pivoted between its ends, carries at its inner end 52ᵇ a stud or pin 65, that is adapted to be engaged by cams or fingers 66, that are carried by a disk 67, secured upon shaft 1. The cams or fingers 66 are adjustable around the periphery of disk 67, and for this purpose they are shown pivoted upon blocks 68, that have recesses 69 to receive the disk 67 and set-screws 70 to secure them in position upon said disk. The cams or fingers 66 are shown held upon the blocks 68 by bolts or screws 71, whereby they may be moved more or less across the plane of pin 65. By these means, according to the adjustment of the cams or fingers 66, the arm 52 will be rocked more or less when the pin 65 is engaged by said cams or fingers, and thus the wheel 45 will be moved more or less across the face of pulley 2. The positions of the cams or fingers 66 relatively to the cams 60 61 can be adjusted, as desired, to regulate the speed of shaft 1 through gears 25 26 before and after the clutch is thrown into or out of mesh. Thus the arrangement may be as follows: When the clutch is in mesh, the pulley 2 will drive shaft 1 at a corresponding speed. When the clutch is next thrown out of mesh, a cam or finger 66 will act to shift wheel 45 the proper distance to cause shaft 1 to rotate at the desired reduced speed, and when another cam or finger 66 engages pin 65 wheel 45 may be adjusted to a different position along the pulley 2 to still further increase or decrease the rotation of shaft 1, and this may be before or after the clutch 1 has again been thrown into or out of mesh. By examining Fig. 2 it will be seen that one finger or cam 66 is on one side of pin 65 and that the other finger or cam 66 is on the opposite side of said pin, whereby arm 52 will be rocked.

A simple form of my invention is illustrated in Figs. 9, 10, and 11, wherein the clutch 10 15, &c., is dispensed with and several other changes in the arrangement made, the principles of the invention remaining the same. In this case the gear 25 is secured upon the driven part or shaft 1, (without the interposition of parts 4 5 6 8 and the clutch,) and the gear 26 is loose thereon, but secured to band wheel or pulley 2, which in turn is free to rotate upon shaft 1, whereby gear 26 is rotated directly by pulley 2 instead of through the medium of pinion 27. The wheel 31 is also loosely mounted upon shaft 1 and in turn carries the pinion 27, which is journaled upon the stud 28, secured to said wheel, (instead of to pulley 2, as in Fig. 4,) and it will be seen that the ratchet-wheel 29 is dispensed with. The wheel 31 is shown in the form of a spur-wheel instead of a worm-wheel, and the worm 35 is replaced by a pinion 35ª, carried by shaft 36, journaled in suitable bearings in support 3, the shaft 36 carrying a bevel-wheel 39ª, that meshes with a corresponding wheel 43ª without the interposition of the intermediate wheel 40, the shaft 44 being journaled in bearings in bracket 42, as before explained. The wheel 45 is mounted upon shaft 44 to engage pulley 2, as before explained, and the shifting arm or fork 48 is shown connected with shaft 49, mounted in the bearings 50. With this arrangement it will be understood that when wheel 45 is adjusted to a point upon the axis of pulley 2 there will be no rotation transmitted to wheel 31, and therefore pinion 27 will not be carried around gears 25 26; but gear 26 being rotated by pulley 2 will transmit motion through pinion 27 and gear 25 to shaft 1, in accordance with the differential of gears 25 26, which will be the highest speed at which pulley 2 can rotate shaft 1. If now wheel 45 be adjusted outwardly along the face of pulley 2, motion will be transmitted through gears 43ª, 39ª, and 35ª to wheel 31, whereupon pinion 27 will be carried bodily around gears 25 26, and thus the action of pinion 27 on gear 25 will be altered, whereby shaft 1 will be driven at a reduced speed, and such speed will be in accordance with the speed of rotation of wheel 31, caused by the distance of wheel 45 from the axis of pulley 2. Thus when wheel 45 is adjusted toward the outer part of pulley 2 wheel 31 will be driven at increased speed, and thereby pinion 27, by being carried around gears 25 26, will transmit slower motion to gear 25, in accordance with the differential between gears 25 26, and by adjusting wheel 45 more or less along the face of pulley 2 the speed of rotation of shaft 1 can be varied. Thus it will be seen that in this modification there is no clutch for direct connection of pulley 2 with shaft 1, and that pinion 27, instead of being carried around by pulley 2, is carried around by gear 31 and travels around gears 25 26 at varying speeds, although it is always rotated on its axis at a given speed by gear 26 and transmits motion to gear 25 in accordance with its speed of travel around said gear and the differential between gears 25 and 26. In both cases, however, the rotation of pinion 27 upon its axis transmits motion to shaft 1.

I do not limit my invention to the precise details of construction shown and described, as they may be varied without departing from the spirit thereof.

Having now described my invention, what I claim is—

1. A variable-speed gearing comprising a driven part, a driving part, gears of the same diameter having a different number of teeth to act upon the driven part, a pinion adapted to engage both of said gears and to be carried around the same, and means for causing said pinion to operate said gears at different speeds according to adjustment, whereby the speed of the driven part may be varied, substantially as described.

2. A variable-speed gearing comprising a driven part, a driving part, means for connecting the driving part with the driven part so that they can rotate at a different or the same speed, and means for regulating the driven part by the driving part so that the former will be driven by the latter at a speed commensurate with the adjustment of the devices that control said parts, substantially as described.

3. A variable-speed gearing comprising a driven part, a driving part, means for positively connecting and disconnecting said parts, and means for operating the driven part by the driving part at varying speeds according to the adjustment of the devices that connect said parts, substantially as described.

4. A variable-speed gearing comprising a driven part, a driving part, a shaft, a sleeve connected with the driven part to operate the same, means for positively connecting and for disconnecting said shaft and sleeve, and means for controlling the operation of said sleeve by the driving part for varying the speed of said sleeve when it is disconnected from said shaft, substantially as described.

5. A variable-speed gearing comprising a driven part, a driving part, a shaft and a sleeve connected to operate the driven part, means to connect the sleeve and shaft positively and to disconnect them, a gear secured to the sleeve, a loose gear, a pinion to mesh with said gears and to be operated by the driving part, and means for moving the loose gear independently to regulate the speed with which the driven part is to be operated when the shaft and sleeve are disconnected, substantially as described.

6. A mechanical movement comprising a driven part, a driving part, a shaft connected with the driving part, a sleeve, means for positively connecting and for disconnecting said shaft and sleeve, means to connect the driving part with said sleeve, and means to adjust such connection for varying the speed of said sleeve when it is disconnected from said shaft, substantially as described.

7. A mechanical movement comprising a driven part, a driving part, means for positively connecting said parts together and for disconnecting them, differential gears one of which is permanently connected with the driven part, a pinion to be operated by the driving part for actuating said gears, and means for connecting the independent gear with the driving part for causing said pinion to vary the speed of the driven part, substantially as described.

8. The combination of a driven part, a driving part, a gear permanently connected with the driven part, a loose gear, a pinion adapted to be carried around said gears, a wheel to be driven by the driving part, gearing connected with said wheel, and a ratchet and dog included in said gearing and adapted to operate said loose gear to cause said pinion to transmit variable speed to the driven part according to the adjustment of said wheel, substantially as described.

9. The combination of a driven part, a driving part, a gear permanently connected with the driven part, a loose gear, a pinion adapted to be carried around said gears, a wheel adapted to be driven by the driving part, gearing connected with said wheel, a dog carried by one of the wheels of said gearing and a ratchet rigidly connected with the loose gear and adapted to be engaged by said dog, substantially as described.

10. The combination of a driven part, a driving part, a gear permanently connected with the driven part, a loose gear, a pinion carried by said driving part to engage said gears, an adjustable wheel to engage the driving part, gearing connected with said wheel and containing a worm and worm-wheel, a dog carried by the worm-wheel, and a ratchet secured to the loose gear and adapted to be engaged by said dog, substantially as described.

11. The combination of a driven part, a driving part, a gear connected with the driven part, a loose gear, said gears having differential teeth, pinions to engage said gears and diametrically disposed, one of said pinions having differential teeth that aline on one side but not on the other, and means for causing the loose gear to transmit variable speed through said pinions to the driven part, substantially as described.

12. The combination of a driven part, a sleeve connected therewith to rotate it, a gear connected with the sleeve, a driving part, a loose gear, a pinion carried by the driving part to engage said gears, and means connected with the driving part for causing the loose gear to have independent movement to regulate the rotation of the driven part according to adjustment, substantially as described.

13. The combination of a driven part, a sleeve connected therewith to rotate it, a driving part, a clutch to positively connect the sleeve with the driving part, means to operate said clutch, differential gears one of which is permanently connected with the sleeve, and means operated by the driving part for causing said gears to transmit variable speed to the driven part, substantially as described.

14. The combination of a driven part, a sleeve connected therewith to rotate it, a driving part, a clutch to permanently connect said sleeve with the driving part, differential gears one of which is connected with said sleeve, adjustable devices connecting the driving part with the loose gear, and a pinion adapted to be operated by the driving part and to act with the loose gear to transmit variable speed to the driven part, substantially as described.

15. The combination of a driven part, a sleeve connected therewith to rotate it, a driving part, a clutch to positively connect the sleeve with the driving part, differential gears one of which is connected with said sleeve, gearing connected with the other gear and adjustably connected with the driving part for independently operating said loose gear, and a pinion carried by the driving part to operate said gears to transmit variable motion to the driven part according to adjustment, substantially as described.

16. The combination of a driven part, a sleeve connected therewith to rotate it, a shaft, a clutch to connect said sleeve and shaft, a driving part attached to said shaft, differential gears one of which is secured to said sleeve and the other loose therefrom, an adjustable wheel to engage the driving part, gearing connected with said wheel and also connected with the loose gear, and a pinion to be operated by the driving part to act upon said differential gears, substantially as described.

17. The combination of a driven part, a worm-wheel carried thereby, a sleeve, a worm carried thereby and meshing with the worm-wheel, a shaft, a clutch to engage said shaft and sleeve, a driving part secured to said shaft, differential gears one of which is secured to said sleeve the other being loose, gearing adjustably connected with said driving part and with the loose gear, and a pinion adapted to be operated by the driving part to act upon said differential gears to vary the speed of rotation of the driven part, substantially as described.

18. The combination of a driven part, a sleeve connected therewith, a hand-wheel connected with said sleeve, a shaft, a clutch to connect said shaft and sleeve through said hand-wheel, a driving part carried by said shaft, differential gears one of which is connected with said shaft, adjustable gearing connected with said driving part and also connected with the loose gear, and a pinion adapted to be operated by the driving part and to act upon said differential gears, substantially as described.

19. The combination of a driven part, a sleeve connected therewith, a shaft, a disk carried by said shaft and having one or more studs, a hand-wheel carried by said sleeve and having clutch-bars to engage said studs, means to shift said clutch-bars, a driving part connected with said shaft, differential gears one of which is connected with said sleeve, adjustable gearing connected with the driving part and also connected with the loose gear, and a pinion adapted to be operated by the driving part and to act upon said gears, substantially as described.

20. The combination of a driven part, a driving part, a clutch to positively connect and disconnect said parts, means for transmitting variable speed from the driving part to the driven part, and means for operating said clutch by the action of the driven part, substantially as described.

21. The combination of a driven part, a driving part a clutch to positively connect and disconnect said parts, means for transmitting variable speed from the driving part to the driven part, a rod connected with said clutch, a spring and latch to operate and hold said rod, and means connected with the driven part for operating said rod and latch, substantially as described.

22. The combination of a driven part, a driving part, a clutch to positively connect and disconnect said parts, means for transmitting variable speed from the driving part to the driven part, a rod connected with said clutch, a spring to move said rod in one direction, a latch to resist said spring, an abutment for said latch, a finger adapted to operate upon said latch and also to actuate said rod, and adjustable cams connected with the driven part for operating said finger, substantially as described.

23. The combination of a driven part, a driving part, a clutch to positively connect and disconnect said parts, means for transmitting variable speed from the driving part to the driven part, a rod connected with said clutch, a spring to operate said rod, a block on said rod, a latch connected with said block, a finger adapted to operate upon said latch and said block, and adjustable cams connected with the driven part for operating said latch and rod, substantially as described.

24. The combination of a driven part, a driving part, a clutch to positively connect and disconnect said parts, means for transmitting variable speed from the driving to the driven part, a rod connected with said clutch, a spring to act upon said rod, a block carried by said rod, a latch carried by the block, an abutment for said latch having inclined faces one of which acts upon the abutment, a finger having an inclined face to act upon the other inclined face of the latch and also adapted to act upon said block, and means connected with the driven part for actuating said finger, substantially as described.

25. The combination of a driven part, a driving part, a clutch to positively connect and disconnect said parts, means for transmitting variable speed from the driving part to the driven part, means adapted to be operated by the driven part for actuating said clutch, and devices adapted to be operated by the driven part for controlling the means that transmit variable motion from the driving part, substantially as described.

26. The combination of a driven part, a driving part, adjustable means for transmitting variable speed from the driving part to the driven part, a wheel included in said means and adapted to be operated by the driving part, and means connected with the driven part for adjusting said wheel, substantially as described.

27. The combination of a driven part, a driving part, means for transmitting variable speed from the driving part to the driven part, an adjustable wheel included in said means, a rocker-arm connected with said wheel, and devices connected with the driven part for operating said rocker-arm, substantially as described.

28. The combination of a driven part, a driving part, means for transmitting variable speed from the driving part to the driven part, an adjustable wheel included in said means, a rocker-arm connected with said wheel, and adjustable fingers connected with the driven part for operating said rocker-arm, substantially as described.

29. The combination of a driven part, a driving part, means for transmitting variable speed from the driving part to the driven part, an adjustable wheel included in said means, a rocker-arm connected with said wheel, a disk to be operated by said driven part, adjustable blocks carried by said disk, and adjustable fingers carried by said blocks adapted to operate said rocker-arm, substantially as described.

30. The combination of a driven part, a driving part, differential gears one of which is permanently connected with the driven part, gearing connecting the loose gear with the driving part, a pinion adapted to operate said gears, a friction-wheel included in said gearing and adapted to be operated by the driving part, a rocker-arm connected with said wheel, and devices connected with the driven part for actuating said rocker-arm, substantially as described.

31. The combination of a driven part, a driving part, differential gears one of which is permanently connected with the driven part, gearing connecting the loose gear with the driving part, a pinion adapted to operate said gears, a wheel included in said gearing and adapted to be operated by the driving part, a rod adapted to shift said wheel along the driving part, a rocker-arm connected with said rod, and means connected with the driven part for operating said rocker-arm, substantially as described.

32. The combination of a driven part, a pulley, differential gears one of which is connected with the driven part, an adjustable wheel to engage said pulley, gearing connected with said wheel for causing said gears to transmit variable speed to the driven part, and means for shifting said wheel along the face of said pulley to vary the speed of the driven part, substantially as described.

33. The combination of a driven part, a pulley, differential gears one of which is connected with the driven part, an adjustable wheel adapted to engage the face of said pulley, gearing connecting said wheel with the loose gear, a pinion adapted to be operated by the pulley to transmit motion to the driven part through said gears, and means for adjusting said wheel along the face of said pulley to regulate the speed of the driven part, substantially as described.

34. A device of the character described comprising a driven shaft, a gear secured thereto, a loose driving-pulley, a gear connected to rotate therewith, a second loose gear carrying a pinion arranged to engage said gears, an adjustable friction-wheel arranged to be operated by the pulley, and connections between said wheel and the last-mentioned gear, the whole arranged to operate substantially as set forth.

35. A device of the character described comprising a driven shaft carrying a tight gear and a loose gear of suitable diameter, a driving-pulley connected to the loose gear to rotate it, a loose gear 31 carrying a pinion the teeth of which mesh with said gears, and means for varying the forward movement of gear 31, substantially as described.

36. A device of the character described comprising a frame, a driven shaft carrying a tight gear, loose gears 26 and 31, a loose pulley 2, a stud carried by the gear 31 and bearing a pinion 27, a shaft 44 bearing a movable friction-wheel, said shaft having connection with the gear 31, and means for varying the position of said wheel along the face of said pulley, substantially as described.

GUSTAV SITTMANN.

Witnesses:
T. F. BOURNE,
F. E. TURNER.